(No Model.)
F. W. SEABURY.
HORSESHOE.
No. 267,023. Patented Nov. 7, 1882.
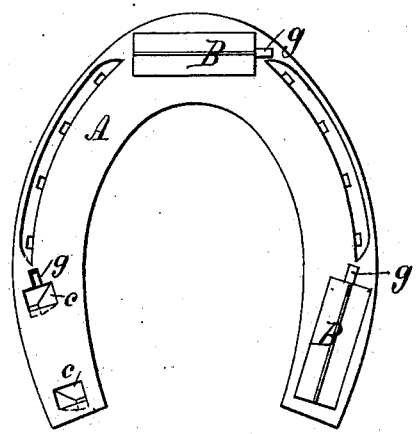
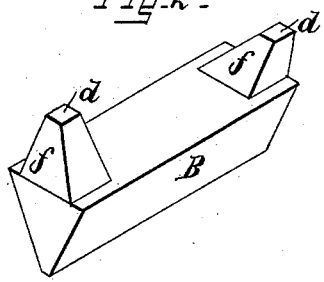
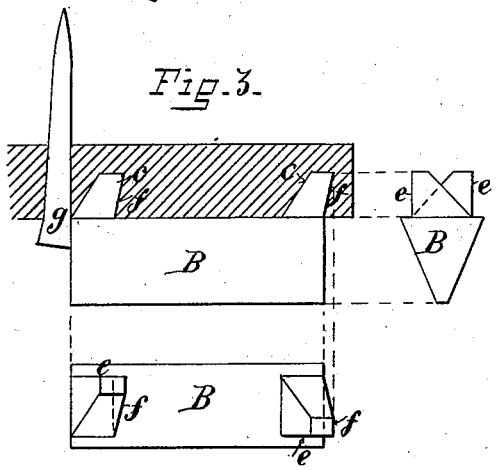
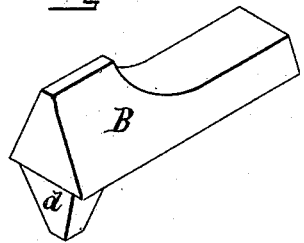
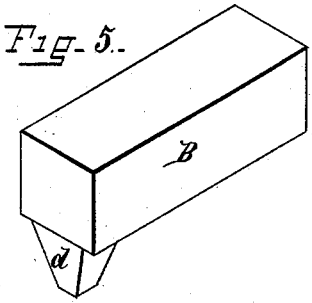
WITNESSES:
Henry J. Miller
Wm. L. Cope
INVENTOR:
Frederick W. Seabury
by J. A. Miller & Co.
Att'ys

UNITED STATES PATENT OFFICE.

FREDERICK W. SEABURY, OF PROVIDENCE, RHODE ISLAND.

HORSESHOE.

SPECIFICATION forming part of Letters Patent No. 267,023, dated November 7, 1882.

Application filed April 1, 1882. (No model.)

*To all whom it may concern:*

Be it known that I, FREDERICK W. SEABURY, of the city and county of Providence, and State of Rhode Island, have invented a new and useful Improvement in Horseshoes; and I hereby declare that the following is a full, clear, and exact description of the same, reference being had to the accompanying drawings, forming part of this specification.

This invention has reference to an improvement in horseshoes provided with detachable calks; and it consists in the novel construction of the calks and the means by which the same are secured, as will be more fully set forth hereinafter.

Figure 1 is a view of my improved horseshoe, one of the heel-calks being shown removed. Fig. 2 is a perspective view of one of the calks, showing the dowels by which the same are secured to the shoe. Fig. 3 is a sectional view, showing the calk secured to the shoe, an end view of the calk, and a plan view of the same, showing the relation of the dowels on the calk to the holes in the shoe. Fig. 4 is a perspective view of one form of calk, and Fig. 5 a perspective view of another form of calk.

In the drawings, A is the horseshoe.

B B are the detachable calks.

$c\ c$ are the holes in the horseshoe, into which the dowels $d\ d$ on the calks enter. These dowels have each one side, $e$, which is perpendicular to the surface of the calk, and one side, $f$, which overhangs the perpendicular line so as to form a dovetail holding-surface, as is clearly shown in Fig. 3. The other two sides of the dowels form inclined planes. When the dowels of the calks are inserted into the holes $c\ c$, formed to correspond with the dowels, the perpendicular surfaces $e\ e$, placed on opposite sides of the two dowels on each calk, form shoulders, against which the calk rests firmly and securely, and the overhanging sides $f\ f$ form the retaining-dovetails, while the inclined sides of the dowels force the faces $e$ and $f$ firmly against the corresponding sides of the shoe, so that the weight of the animal and the blows caused by contact with the road secure rather than loosen the calks.

$g\ g$ are horseshoe-nails, provided with a head somewhat larger and stronger than the head of ordinary horseshoe-nails. These nails are driven through the horseshoe into the hoof in the usual manner. The head rests firmly against the calk and prevents it from yielding in the direction of the nail. As the nail is tapering, it forms a powerful wedge, and, in being driven, forces the dowels of the calk firmly against the sides $e$ and $f$. As long as the nail remains the calk will be securely held, and by withdrawing the nail the calk can be readily removed. The calks can be readily removed, sharpened, and again secured without removing the shoe.

I do not claim anything shown or described in the patent of F. Shinn, No. 55,374, granted June 5, 1866.

Having thus described my invention, I claim as new and desire to secure by Letters Patent—

The combination, with the horseshoe A, provided with the dowel-holes $c\ c$, extending partially through the same and provided with two inclined walls, as shown, of the calks B, provided with the dowels $d\ d$, each of which has one perpendicular side, $e$, an overhanging side, $f$, and two inclined sides, as shown, to fit against corresponding faces of the dowel-holes, and the nail $g$, having a wedge-like head and adapted to be driven into a through nail-hole, with which the shoe is provided adjacent to the inner dowel-hole, all arranged to operate as specified.

FREDERICK W. SEABURY.

Witnesses:
M. E. EMERSON,
J. A. MILLER, Jr.